US008343426B2

(12) United States Patent
Song

(10) Patent No.: US 8,343,426 B2
(45) Date of Patent: Jan. 1, 2013

(54) SEPARABLE TEST TUBE FOR USE IN A CENTRIFUGAL SEPARATOR

(76) Inventor: Hyo Seop Song, Seoul (KR)

( * ) Notice: Subject to any disclaimer, the term of this patent is extended or adjusted under 35 U.S.C. 154(b) by 0 days.

(21) Appl. No.: 13/319,670

(22) PCT Filed: May 10, 2010

(86) PCT No.: PCT/KR2010/002964

§ 371 (c)(1),
(2), (4) Date: Nov. 9, 2011

(87) PCT Pub. No.: WO2010/131880

PCT Pub. Date: Nov. 18, 2010

(65) Prior Publication Data

US 2012/0058027 A1 Mar. 8, 2012

(30) Foreign Application Priority Data

May 9, 2009 (KR) ........................ 10-2009-0040503

(51) Int. Cl.
*G01N 9/30* (2006.01)

(52) U.S. Cl. .......... 422/72; 422/548; 422/559; 600/595; 210/645

(58) Field of Classification Search .................... 422/72, 422/548–549, 559
See application file for complete search history.

(56) References Cited

U.S. PATENT DOCUMENTS 3,583,627 A * 6/1971 Wilson ............................ 494/36
5,882,318 A * 3/1999 Boyde ........................... 600/595
7,153,477 B2 12/2006 DiCesare et al.
2003/0013205 A1 1/2003 Konrad
2005/0139547 A1 * 6/2005 Manoussakis et al. ....... 210/645

FOREIGN PATENT DOCUMENTS

JP 59048740 3/1984
JP 11239574 9/1999

* cited by examiner

*Primary Examiner* — Jill Warden
*Assistant Examiner* — Julie Tavares
(74) *Attorney, Agent, or Firm* — Robert D. Atkins; Patent Law Group: Atkins & Associates, P.C.

(57) ABSTRACT

The present invention includes a separable test tube for use in a centrifugal separator that does not need to separately transfer separation liquid to another test tube for a second separation after a first separation. The separable test tube includes a first tube including a first coupling portion, a second coupling portion, and an adjustment portion. A second tube includes a first body part, a first space portion, a first packing fastener, a third coupling portion which engages the first coupling portion, and an adjustment groove into which the adjustment portion is inserted. A third tube includes a second body part having a second space portion, a second packing fastener, and a fourth coupling portion which engages the second coupling portion. First and second watertight members are coupled to the first and second coupling portions, respectively. First and second packings are coupled to the first and second packing fasteners, respectively.

3 Claims, 10 Drawing Sheets

SEPARABLE TEST TUBE FOR USE IN A CENTRIFUGAL SEPARATOR

CLAIM TO FOREIGN PRIORITY

The present application is a U.S. National Stage Application filed under 35 U.S.C. 371 claiming priority from International Application No. PCT/KR2010/002964, filed May 10, 2010, which claims the benefit of Korean Application No. 10-2009 -0040503, filed May 9, 2009, and which applications are incorporated herein by reference.

FIELD OF THE INVENTION

The present invention relates to a separable test tube for use in a centrifugal separator, and more particularly, to a test tube for use in a centrifugal separator which can be separated into a first tube, a second tube, and a third tube.

BACKGROUND OF THE INVENTION

Centrifugation is a technique that is traditionally used more frequently in a biological or medical experiment. A centrifugal separator is provided in almost all biological experiments.

The centrifugal separator separates, refines, and concentrates materials having different compositions or specific gravities stored in the test tube by the action of centrifugal force according to the rotation of a rotor mounted with a test tube. The centrifugal separator is a machine that separates solid particles in a liquid or liquids having different specific gravities.

FIG. 1 is a perspective view of a test tube mounted on a centrifugal separator in the related art.

As shown in FIG. 1, the test tube for use in the centrifugal separator in the related art includes a tube body 110 and a cap 120.

A testing process using the test tube for use in the centrifugal separator in the related art as configured above will be briefly described below.

First, when the centrifugal separator is operated at a high speed after putting homogenate to be separated in the test tube for use in the centrifugal separator in the related art and putting the test tube in the centrifugal separator, a material having a comparative small size and low density is configured as supernatant and a material having a comparatively large size and density is precipitated to a pellet, such that homogenate is primarily separated.

Thereafter, a required experiment is performed by additionally obtaining supernatant or a required experiment is performed by additionally obtaining supernatant after putting the test tube in the centrifugal separator and operating the test tube at a higher speed to perform a second separation.

However, in the test tube for use in the centrifugal separator in the related art, an upper layer and a lower layer that are separated from each other are mixed with each other again a short time after a centrifugal separation and are reseparated by operating the centrifugal separator again.

Further, when the second separation is required after a first separation, the supernatant separated primarily should be transferred to another test tube and in this process, the supernatant is exposed to the air and is subject to contamination.

SUMMARY OF THE INVENTION

An objective of the present invention is to provide a separable test tube for use in a centrifugal separator in which a separation liquid will not be mixed again because a third tube can be separated just after a centrifugal separation is performed while a first tube, a second tube, and the third tube are coupled with each other.

Another objective of the present invention is to provide a separable test tube for use in a centrifugal separator that puts the second tube coupled with the first tube in the centrifugal separator again to centrifugally separate the first and second tubes without the need to replace the test tube when the second separation is required after the first separation.

In order to achieve the above objectives, a separable test tube for use in a centrifugal separator according to the present invention includes: a first tube including a first coupling portion with a first thread formed on an inner circumferential surface thereof and a second coupling portion which protrudes and extends from the first coupling portion and which has a second thread and a first groove formed along an outer circumferential surface thereof, and inside which an adjustment portion is fixed; a second tube including a first body part having a first space portion formed therein and a first packing fastener formed at one side thereof, and a third coupling portion which protrudes and extends to the other side of the first body part, has a third thread and a second groove which engage in the first thread on an outer circumferential surface thereof, and has an adjustment groove opened and closed as the adjustment portion, which is formed therein; a third tube including a second body part having a second space portion formed therein and a second packing fastener formed at one side thereof and a fourth coupling portion which extends at the other side of the second body part and has a fourth thread which engages in the second thread formed on an inner circumferential surface thereof; a first watertight member coupled to the first groove; a second watertight member coupled to the second groove; a first packing coupled to the first packing fastener; and a second packing coupled to the second packing fastener.

As seen in the above description, a separable test tube for use in a centrifugal separator according to the present invention puts homogenate in the present invention and separates the present invention by using the centrifugal separator to separately store each part required in an experiment, thereby increasing experimental efficiency.

Further, the possibility of contamination of a separated liquid by exposure to air is avoided because the test tube does not need to be replaced in the second separation after the first separation.

DETAILED DESCRIPTION OF THE DRAWINGS

Hereinafter, exemplary embodiments of a separable test tube for use in a centrifugal separator according to the present invention will be described in detail with reference to the accompanying drawings.

Figure 1:
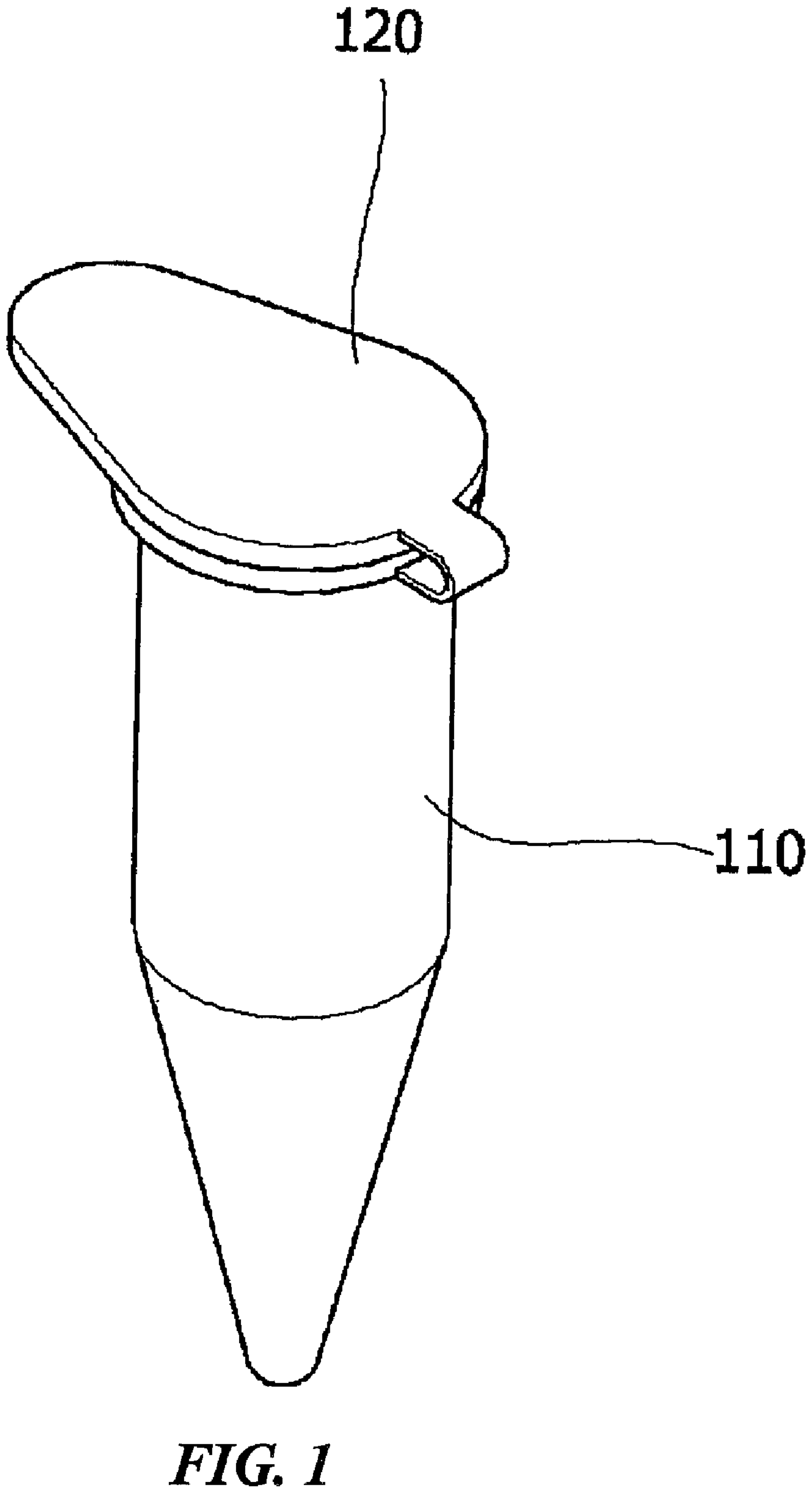
FIG. 1 is a perspective view of a test tube mounted on a centrifugal separator in the related art.
Figure 2A:
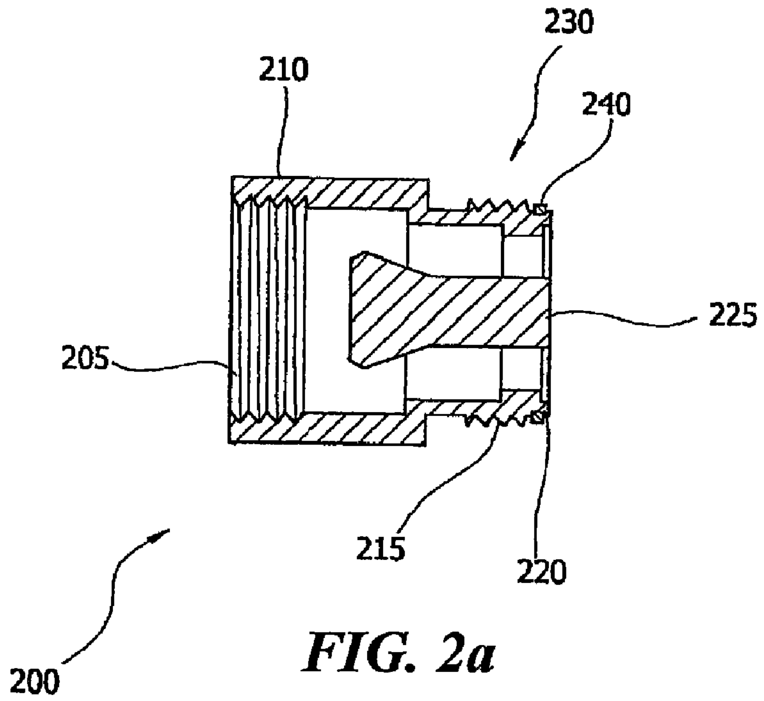
FIGS. 2*a*-2*b* are cross-sectional views and a right side view of a first tube according to a first exemplary embodiment of the present invention.
Figure 2B:
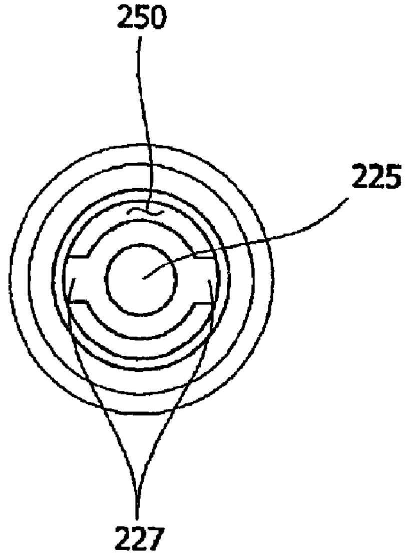

FIGS. 2*a*-2*b* are cross-sectional views and a right side view of a first tube according to a first exemplary embodiment of the present invention.

As shown in FIGS. 2*a*-2*b*, the first tube 200 according to the first exemplary embodiment of the present invention includes a first coupling portion 210 with a first thread 205 formed an inner circumferential surface thereof and a second coupling portion 230 which protrudes and extends from the first coupling portion 210 and which has a second thread 215 and a first groove formed along an outer circumferential surface thereof, and inside which an adjustment portion is fixed.

The first thread 205 is formed on the inner circumferential surface of the first coupling portion 210 and the first coupling portion 210 is preferably provided in a hollow cylindrical shape.

The second coupling portion 230 protrudes and extends from the first coupling portion 210 and the second coupling portion 230 is also preferably provided in the cylindrical shape.

The second thread 215 and the first groove 220 are formed on the outer circumferential surface of the second coupling portion 230 and the second thread 215 is coupled with a fourth thread 415 (see FIG. 4) of a third tube 400 (see FIG. 4) to be described below and a first watertight member 240 is coupled to the first groove 220.

The first watertight member 240 is preferably provided as an O-ring made of rubber, but is not particularly limited thereto.

The first adjustment portion 225 has a cylindrical or a triangular flask shape and has an outer circumferential surface fixed by a plurality of fixing wings to form the inner circumferential surface of the second coupling portion 230 and a path 250. In FIGS. 2*a*-2*b*, the adjustment portion 225 has the triangular flask shape and is fixed by two fixing wings 227, but the adjustment portion 225 may have the cylindrical shape and the number of the fixing wings 227 may also be three or more by considering the flow rate or flow velocity of a separation liquid that moves through the path 250 in centrifugal separation.

Figure 3:
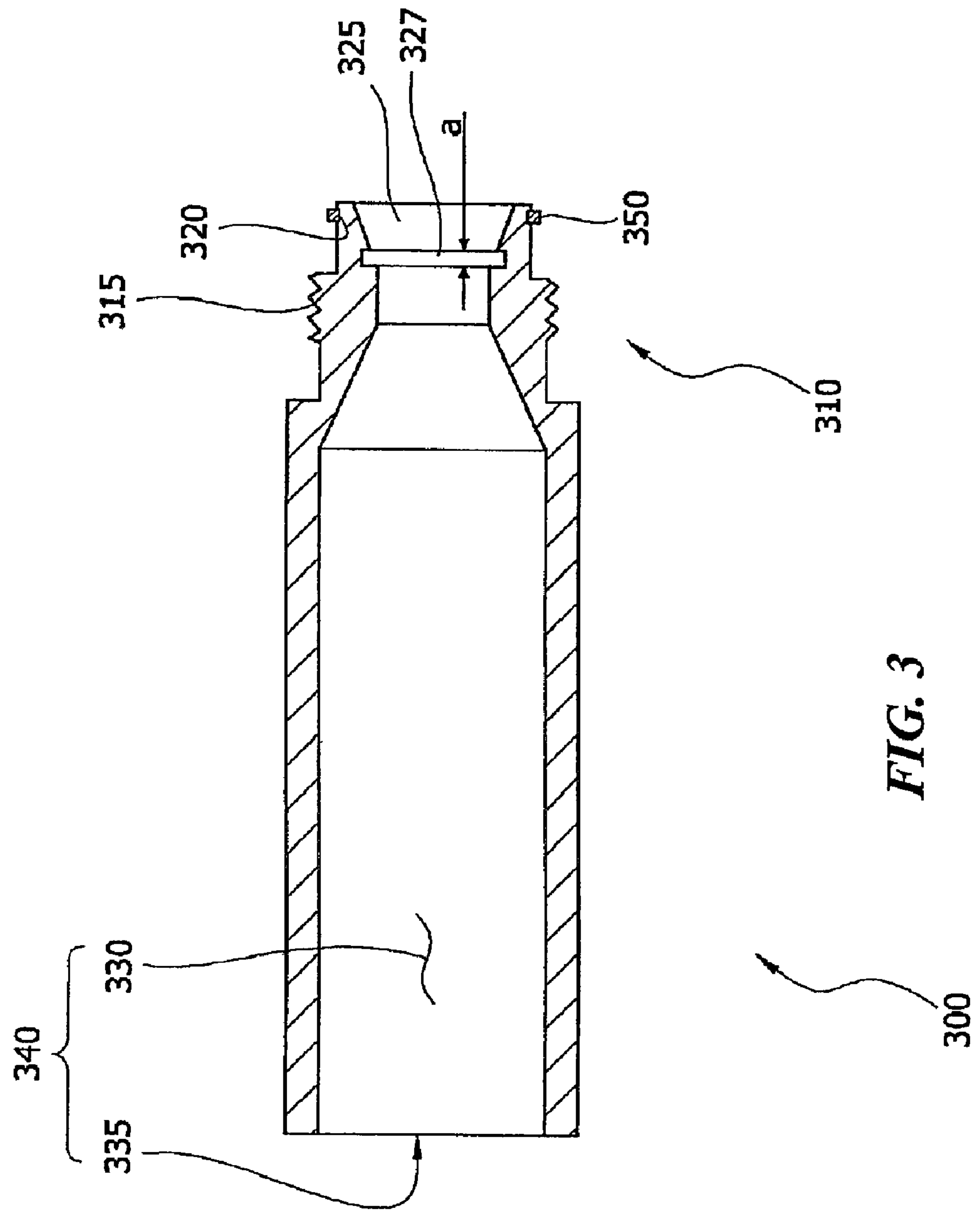
FIG. 3 is a cross-sectional view of a second tube according to the first exemplary embodiment of the present invention.

FIG. 3 is a cross-sectional view of a second tube according to the first exemplary embodiment of the present invention.

As shown in FIG. 3, the second tube 300 according to the first exemplary embodiment of the present invention includes a first body part 340 having a first space portion 330 formed therein and a first packing fastener 335 formed at one side thereof, and a third coupling portion 310 which protrudes and extends to the other side of the first body part 340 and has a third thread 315 and a second groove 320 which engage in the first thread 205 (see FIGS. 2*a*-2*b*), on an outer circumferential surface thereof, and has an adjustment groove 325 opened and closed as the adjustment portion 225 (see FIGS. 2*a*-2*b*), which is formed therein.

The first body part 340 has the first space portion 330 formed therein and the first packing fastener 335 formed at one side thereof. Homogenate for centrifugal separation is filled in the first space portion 330 and a first packing 510 (see FIG. 5) to be described below is fastened to the first packing fastener 335.

The third coupling portion 310 protrudes and extends to the other side of the first body part 340 and has the third thread 315 and the second groove 320 formed on the outer circumferential surface thereof and has the adjustment groove 325 formed therein. The third thread 315 is formed at one side of the outer circumferential surface of the third coupling portion 310 and the second groove 320 is formed at the other side of the outer circumferential surface of the third coupling portion 310.

The third thread 315 engages in the first thread 205 of the first tube 200 (see FIGS. 2*a*-2*b*) and a second watertight member 350 is mounted in the second groove 320.

The second watertight member 350 is preferably provided as the O-ring made of rubber, but is not particularly limited thereto.

The adjustment groove 325 is formed in the third coupling portion 310. In FIG. 3, the adjustment groove 325 is formed toward the other side from one end of the third coupling portion 310 in a fallopian tube shape having a slope inside thereof, but the shape of the adjustment portion 325 is not particularly limited thereto.

An adjustment groove step 327 closely contacting the end of the adjustment portion 225 (see FIGS. 2*a*-2*b*) is further formed at one side of the adjustment groove 325. The length (a) of the adjustment groove step 327 is preferably formed appropriately according to a length that closely contacts the end of the adjustment portion 225.

Figure 4:
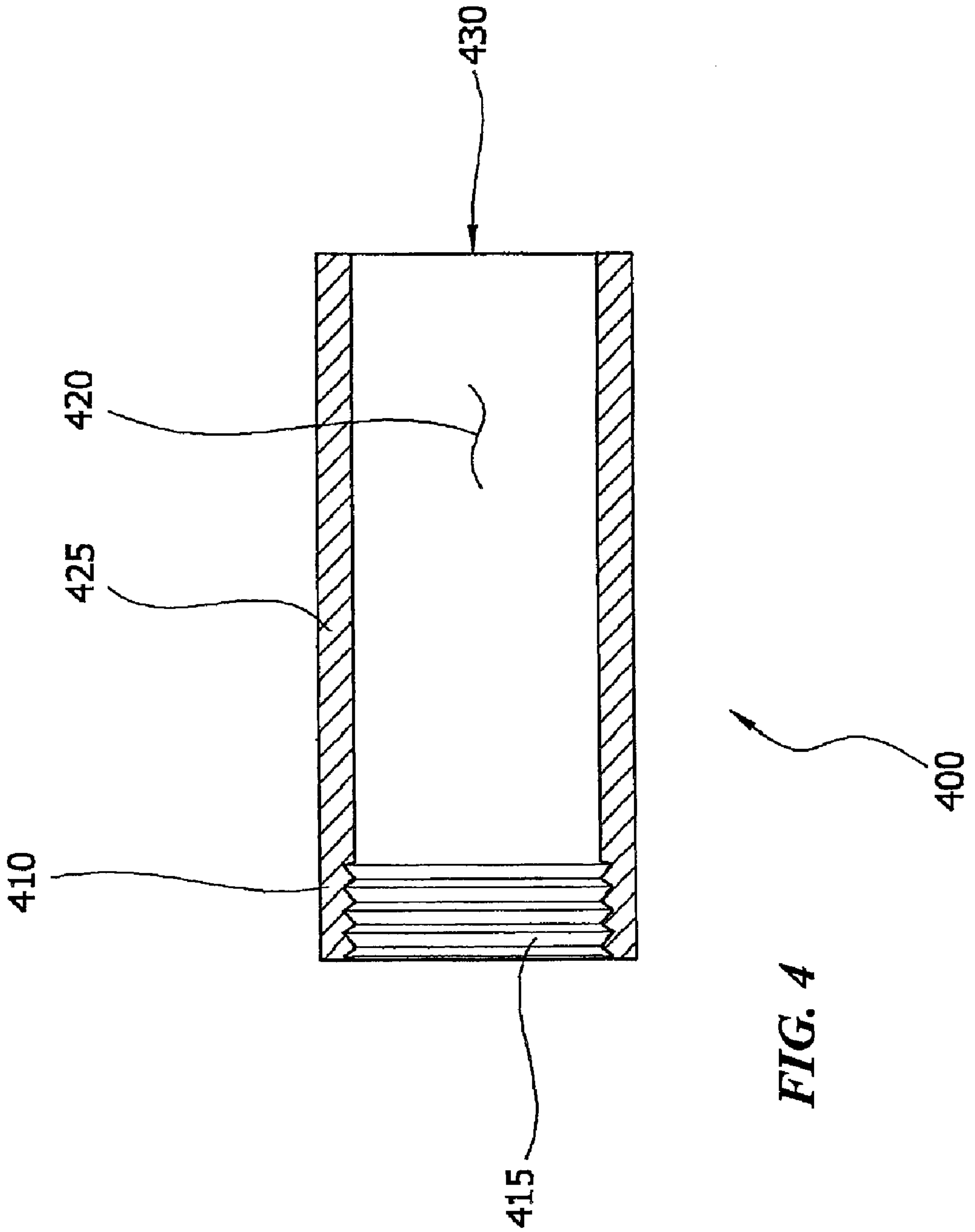
FIG. 4 is a cross-sectional view of a third tube according to the first exemplary embodiment of the present invention.

FIG. 4 is a cross-sectional view of a third tube according to the first exemplary embodiment of the present invention.

As shown in FIG. 4, the third tube 400 according to the first exemplary embodiment of the present invention includes a second body part 425 having a second space portion 420 formed therein and a second packing fastener 430 formed at one side thereof and a fourth coupling portion 410 which extends at the other side of the second body part 425 and has a fourth thread 415 which engages in the second thread 215 (see FIGS. 2*a*-2*b*) formed on an inner circumferential surface thereof.

The second space portion 420 is provided in the second body part 425 and a separation catalyst or a part having large specific gravity after centrifugal separation is stored in the second space portion 420.

The second packing fastener 430 is formed at one side of the second body part 425. A second packing 520 (see FIG. 6) is fastened to the second packing fastener 430.

The fourth coupling portion 410 extends at the other side of the second body part 425. The fourth thread 415 is formed on an inner circumferential surface of the fourth coupling portion 410 to be coupled with the second thread 215 (see FIGS. 2*a*-2*b*) of the second coupling portion 230 (see FIGS. 2*a*-2*b*).

Figure 5:
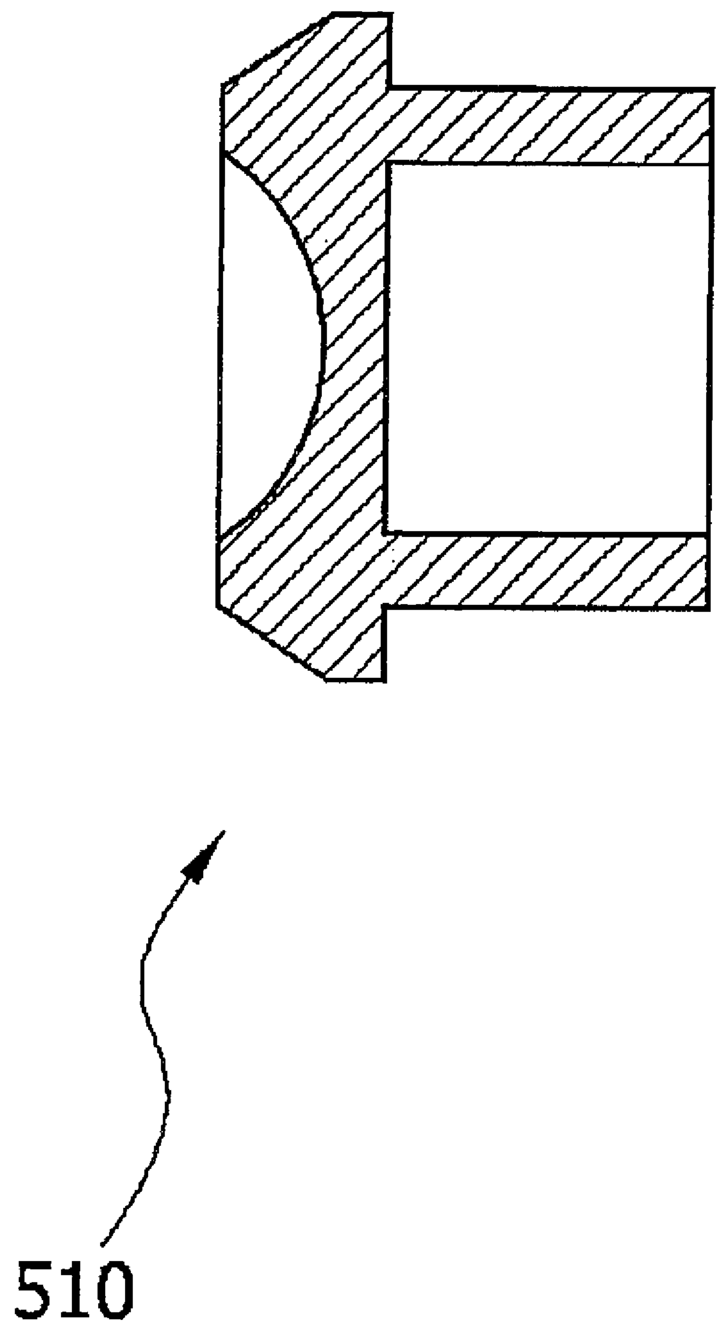
FIG. 5 is a cross-sectional view of a first packing according to an exemplary embodiment of the present invention.
Figure 6:
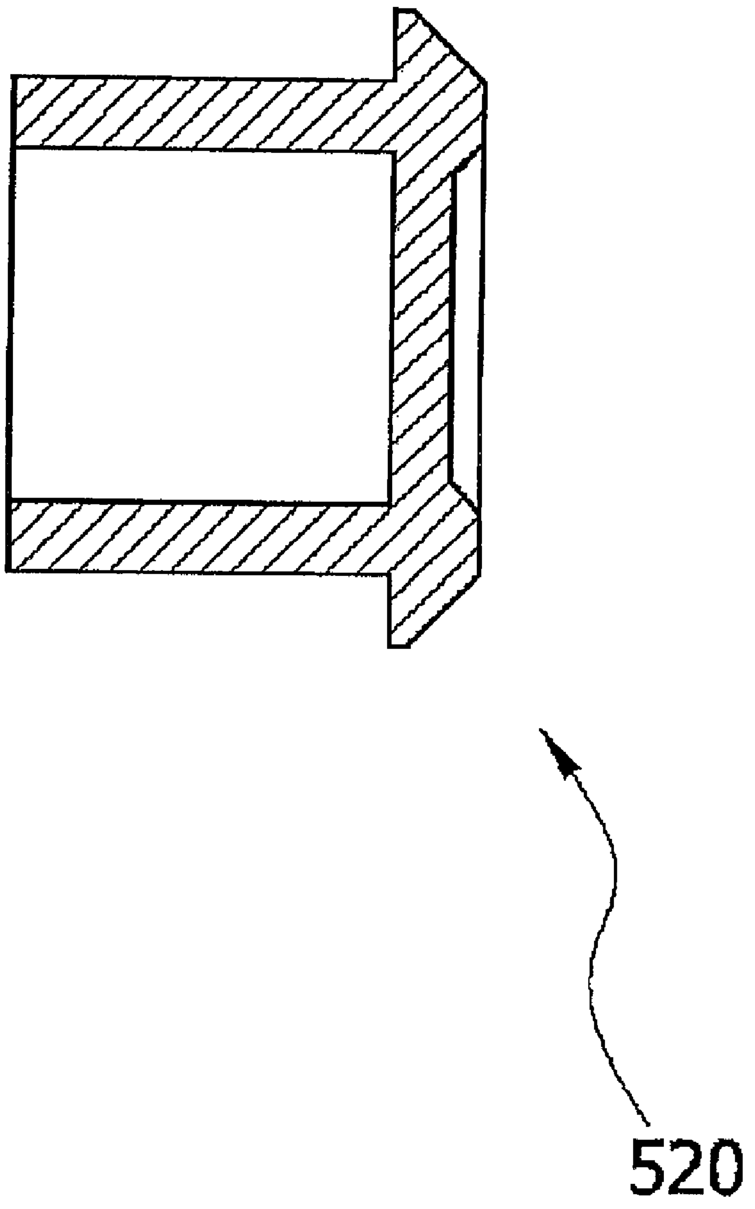
FIG. 6 is a cross-sectional view of a second packing according to an exemplary embodiment of the present invention.

FIG. 5 is a cross-sectional view of the first packing 510 according to an exemplary embodiment of the present invention and FIG. 6 is a cross-sectional view of a second packing 520 according to an exemplary embodiment of the present invention.

The first packing 510 and the second packing 520 fit in the first packing fastener 335 (see FIG. 3) of the first body part 340 (see FIG. 3) and the second packing fastener 430 (see FIG. 4) of the second body part 425 (see FIG. 4), respectively, serve to prevent the separation liquid from leaking.

Accordingly, the first packing 510 and the second packing 520 are preferably made of a silicon material, but are not particularly limited thereto.

Figure 7:
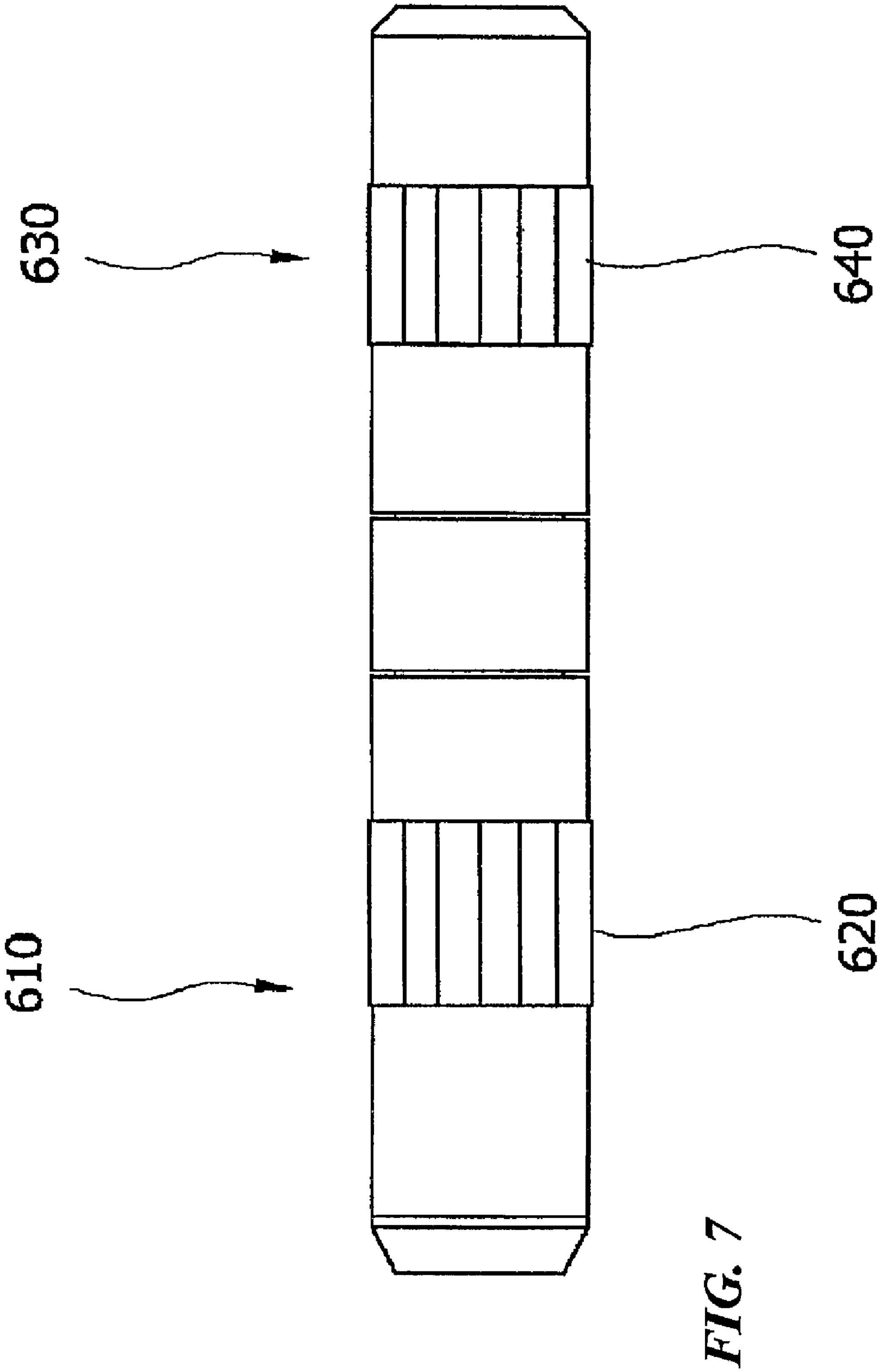
FIG. 7 is a cross-sectional view of a separable test tube for use in a centrifugal separator according to a second exemplary embodiment of the present invention.

FIG. 7 is a cross-sectional view of a separable test tube for use in a centrifugal separator according to a second exemplary embodiment of the present invention.

As shown in FIG. 7, a plurality of first friction protrusions 620 are formed on an outer circumferential surface of a second tube 610 of the separable test tube for use in a centrifugal separator according to the second exemplary embodiment of the present invention and a plurality of second friction protrusions 640 are formed on an outer circumferential surface of a third tube 630.

The first friction protrusions 620 and the second friction protrusions 640 are used to provide appropriate friction force in order to prevent the second tube 610 and the third tube 630 from sliding at the time of rotating the second tube 610 and the third tube 630 for coupling and separation. A plurality of concave-convex portions is formed by embossing outer circumferential surfaces of the second tube 610 and the third tube 630.

The first friction protrusions 620 and the second friction protrusions 640 have the number and the length thereof determined to provide the appropriate friction force.

Figure 8:
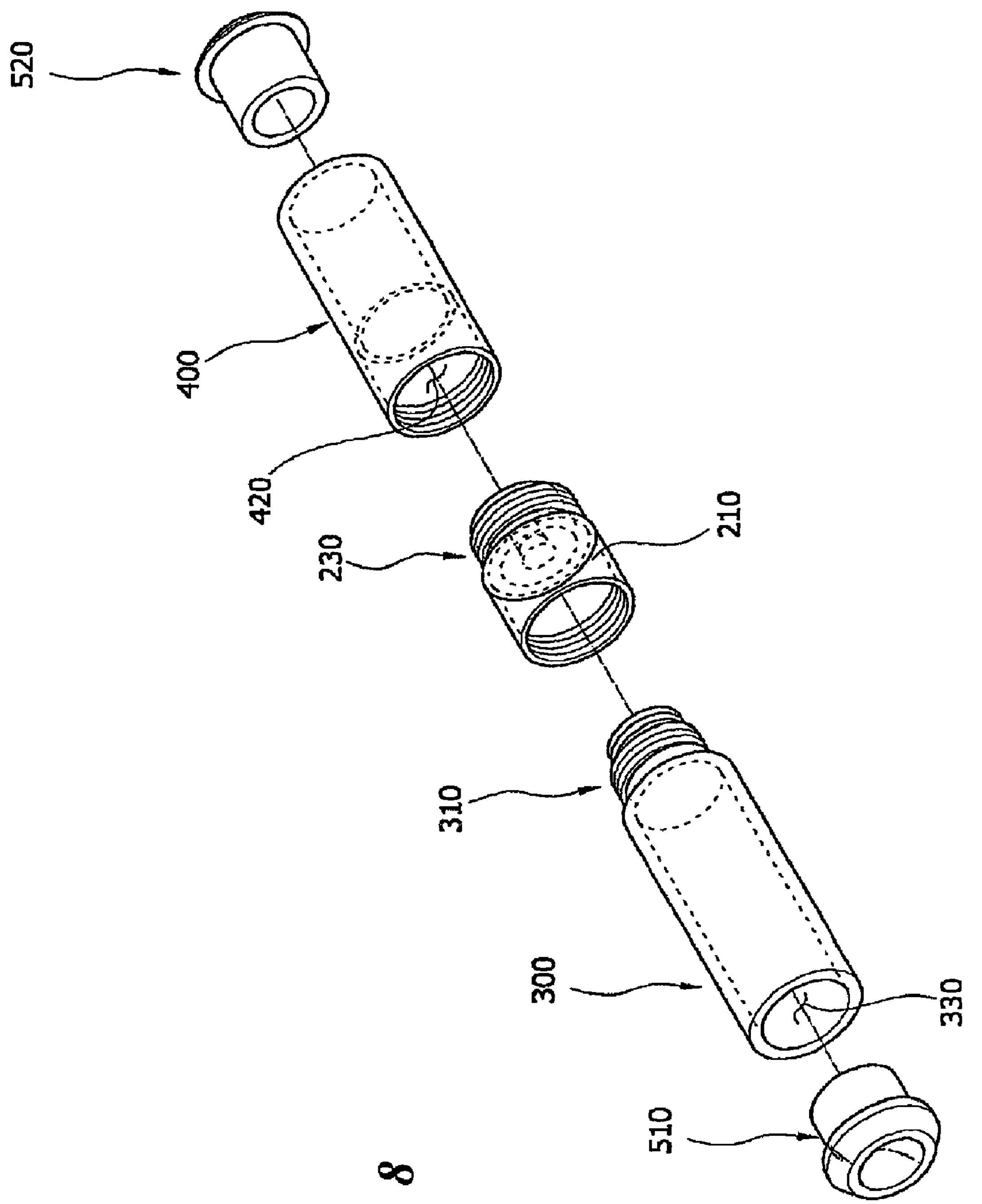
FIG. 8 is a coupled perspective view of the separable test tube for use in a centrifugal separator according to a second exemplary embodiment of the present invention.
Figure 9:
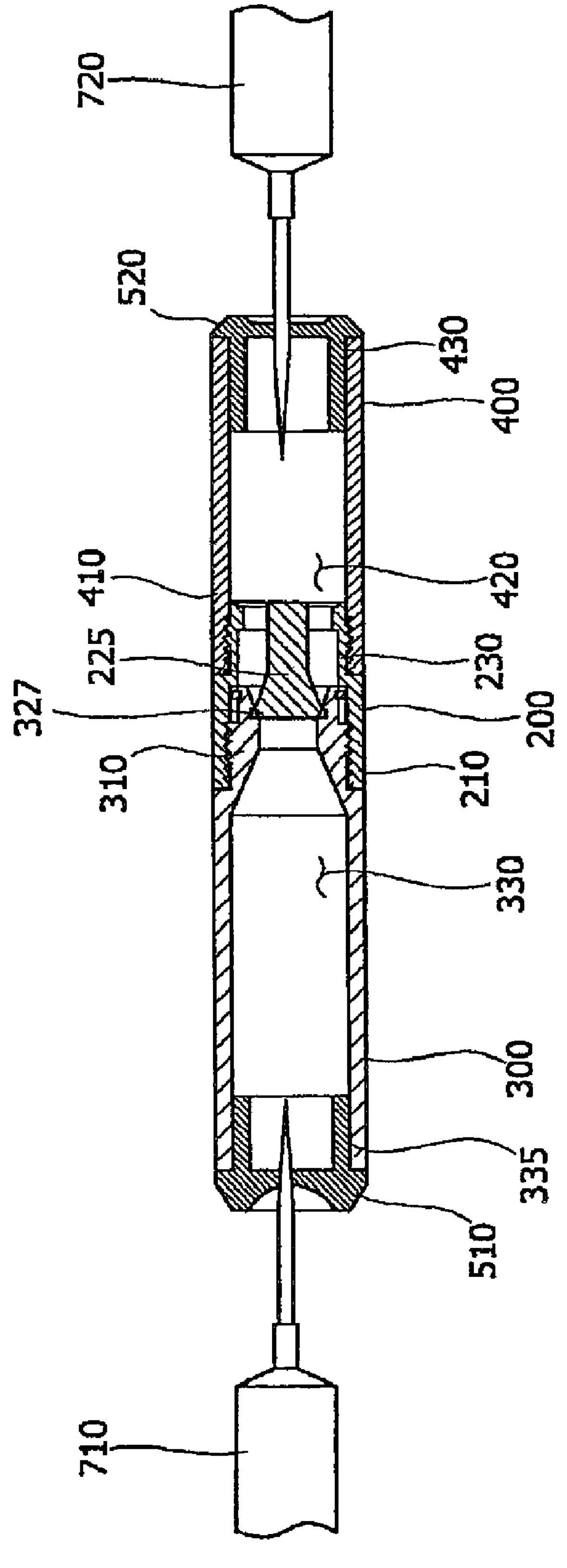
FIGS. 9 and 10 are cross-sectional views showing a use state of the present invention.
Figure 10:
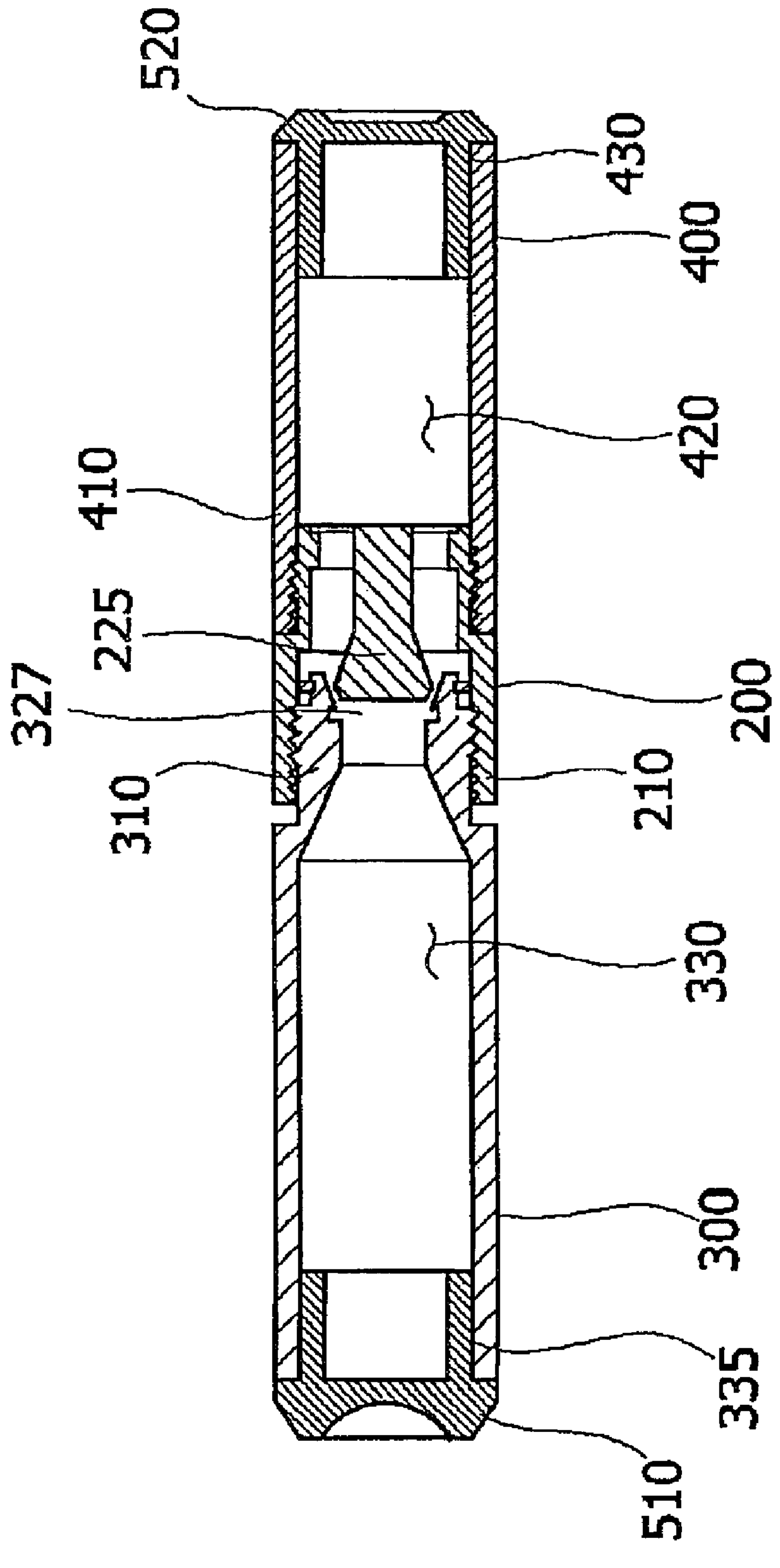

FIG. 8 is a coupled perspective view of the separable test tube for use in a centrifugal separator according to a second exemplary embodiment of the present invention and FIGS. 9 and 10 are cross-sectional views showing a use state of the present invention.

Referring to FIGS. 8, 9, and 10, a centrifugal separation process using the present invention will be described below.

First, a tester relatively rotates the first tube 200 with respect to the second tube 300 in one direction while inserting the third coupling portion 310 of the second tube 300 into the first coupling portion 210 of the first tube 200 to couple the first tube 200 and the second tube 300 with each other.

In this case, the adjustment portion 225 of the first tube 200 is closely attached to the adjustment groove step 327 of the second tube 300 by relatively rotating the first tube 200 with respect to the second tube 300.

Thereafter, the first tube 200 and the third tube 400 are coupled with each other by relatively rotating the third tube 300 with respect to the first tube 200 in one direction while inserting the second coupling portion 230 of the first tube 200 into the fourth coupling portion 410 of the third tube 400. In addition, the first packing 510 fits in the first packing fastener 335 of the second tube 300 and the second packing 520 fits in the second packing fastener 430.

In addition, homogenate (a sample to be centrifugally separated) is filled in the first space 330 of the second tube 300 by using a syringe 710 and the separation catalyst is filled in the second space portion 420 of the third tube 400 by using another syringe 720 (a state of FIG. 9).

Thereafter, when the adjustment portion 225 which is closely attached to the adjustment groove step 327 is separated by approximately 2 mm by rotating the first tube with respect to the second tube 300 once in the other direction (a state of FIG. 10) and thereafter, centrifugal separation is performed at a high speed (approximately 3000 rpm) by mounting the present invention on the centrifugal separator, the homogenate (the sample to be centrifugally separated) filled in the first space portion 330 and the separation catalyst filled in the second space portion 420 are mixed with each other, and as a result, a material having a relatively small size and density is positioned in the first space portion 330 and the separation catalyst is positioned in the first tube 200 and a material having a relatively large size and density is positioned in the second space portion 420 to separate the homogenate primarily.

When the first centrifugal separation is terminated as described above, the test tube which is the present invention is taken out from the centrifugal separator and thereafter, the adjustment portion 225 is closely attached to the adjustment groove step 327 again by relatively rotating the first tube 200 with respect to the second tube 300 in one direction, and as a result, a sample positioned in the first space portion 330 and a sample positioned in the second space portion 420 are not mixed.

In this case, when the sample positioned in the second space portion 420 is unnecessary or is stored separately, the third tube 400 is separated from the first tube 200 and thereafter, the sample positioned in the second space portion 420 may be removed or stored separately to achieve experimental convenience.

Further, when the second centrifugal separation is required with the sample positioned in the first space portion 330 of the second tube 300 after executing the first centrifugal separation, the test tube which is the present invention is mounted on the centrifugal separator again to rotate at a high speed (approximately 5000 rpm), thereby avoiding problems (inconvenience to transfer the firstly separated supernatant to another test tube when the second separation is required after the first separation and thereby introducing the possibility of contamination of the supernatant due exposure to the air during this process) when using the test tube in the related art.

Various substitutions and changes of the present invention can be made by those skilled in the art within the scope without departing from the spirit of the present invention. Therefore, the present invention is not limited to the exemplary embodiments and the accompanying drawings.

What is claimed:

1. A separable test tube for use in a centrifugal separator, comprising:

a first tube including a first coupling portion with a first thread formed an inner circumferential surface thereof and a second coupling portion which protrudes and extends from the first coupling portion and which has a second thread and a first groove formed along an outer circumferential surface thereof, and inside which an adjustment portion is fixed;

a second tube including a first body part having a first space portion formed therein and a first packing fastener formed at one side thereof, and a third coupling portion which protrudes and extends to the other side of the first body part, and which has a third thread and a second groove which engage in the first thread along an outer circumferential surface thereof, and which has an adjustment groove opened and closed as the adjustment portion is inserted therein, wherein the adjustment portion has a cylindrical or a triangular flask shape and has an outer circumferential surface fixed by a plurality of fixing wings to form a path in an inner circumferential surface of the second coupling portion, and the adjustment groove has a fallopian tube shape having a slope inside thereof;

a third tube including a second body part having a second space portion formed therein and a second packing fastener formed at one side thereof, and a fourth coupling portion which extends at the other side of the second body part and has a fourth thread which engages in the second thread formed on an inner circumferential surface thereof;

a first watertight member coupled to the first groove;

a second watertight member coupled to the second groove;

a first packing coupled to the first packing fastener; and a second packing coupled to the second packing fastener.

2. The separable test tube for use in a centrifugal separator of claim 1, wherein an adjustment groove step closely contacting the end of the adjustment portion is further formed at one side of the adjustment groove.

3. The separable test tube for use in a centrifugal separator of claim 1, wherein a plurality of first friction protrusions are formed on an outer circumferential surface of the second tube and a plurality of second friction protrusions are formed on an outer circumferential surface of the third tube.

* * * * *